(12) United States Patent
Seith et al.

(10) Patent No.: US 9,333,819 B1
(45) Date of Patent: May 10, 2016

(54) TIRE-WHEEL SEPARATION TOOL

(71) Applicant: BeadBuster LLC, Philadelphia, PA (US)

(72) Inventors: Warren A. Seith, Bethlehem, PA (US); Lucas J. Taylor, Philadelphia, PA (US)

(*) Notice: Subject to any disclaimer, the term of this patent is extended or adjusted under 35 U.S.C. 154(b) by 0 days.

(21) Appl. No.: 14/976,217

(22) Filed: Dec. 21, 2015

(51) Int. Cl.
*B60C 25/132* (2006.01)
*B60C 25/01* (2006.01)
*B60C 25/02* (2006.01)

(52) U.S. Cl.
CPC .............. *B60C 25/015* (2013.04); *B60C 25/01* (2013.01); *B60C 25/02* (2013.01)

(58) Field of Classification Search
CPC .............................. B60C 25/015; B60C 25/01
USPC ................................. 157/1.17, 1.48
See application file for complete search history.

(56) References Cited

U.S. PATENT DOCUMENTS

| | | | | |
|---|---|---|---|---|
| 2,520,330 A * | 8/1950 | Northrup | ............... | B60C 25/025 157/1.17 |
| 2,581,086 A * | 1/1952 | Edenfield | ............... | B60C 25/025 157/1.17 |
| 2,900,016 A * | 8/1959 | Woodward | ............... | B60C 25/02 157/1.17 |
| 2,956,620 A * | 10/1960 | Schwarz | ............... | B60C 25/025 157/1.17 |
| 3,648,751 A * | 3/1972 | Archidoit | ............... | B60C 25/025 157/1.17 |
| 3,693,692 A * | 9/1972 | Branick | ................... | B60C 25/02 157/1.17 |
| 3,707,179 A * | 12/1972 | Le Pier | ................... | B60C 25/02 157/1.17 |
| 3,771,580 A * | 11/1973 | Branick | ................... | B60C 25/02 157/1.17 |
| 3,880,220 A * | 4/1975 | Bunts | .................... | B60C 25/025 157/1.17 |
| 4,256,161 A | 3/1981 | Chisum | | |
| 4,589,462 A | 5/1986 | Giles | | |
| 4,785,865 A | 11/1988 | Folstad | | |
| 4,787,433 A | 11/1988 | Thomas | | |
| 4,913,770 A | 4/1990 | Sims | | |
| 4,969,498 A * | 11/1990 | Sheets | ................... | B60C 25/025 157/1.17 |
| 7,513,288 B2 * | 4/2009 | Corghi | ................... | B60C 25/02 157/1.17 |
| 7,861,760 B2 * | 1/2011 | Ochoa | ................... | B60C 25/04 157/1.3 |

OTHER PUBLICATIONS

BeadBuster XB-450 Owners Manual v1.1 circa Jan. 2013. EFS File name: 20160209_14-976217_IDS_NPL_Cite1.pdf.
AME/Little Buddy Bead Breaker web page of Northern Tool + Equipment, printed Jan. 31, 2016, published approx. Sep. 2008. EFS File name: 20160209_14-976217_IDS_NPL_Cite2.pdf.

(Continued)

*Primary Examiner* — Hadi Shakeri
*Assistant Examiner* — Danny Hong
(74) *Attorney, Agent, or Firm* — John M. Hammond; Patent Innovations LLC

(57) ABSTRACT

A tire changing tool comprising a tool body, a ram, a ram actuator, a clamp arm, and a clamp actuator. The tool body is comprised of a housing, a lateral bracket, and first and second holding feet. The ram is comprised of a ram body and a ram base comprised of first and second opposed ram feet. The ram body is removable from an inner cavity of the housing, and is rotatable and replaceable in the inner cavity of the housing. Prior to fitting the tool to the tire and wheel for its intended use, the position of the ram base may selected between a first position in which the first ram foot extends laterally outwardly a first distance between the first and second holding feet, or a second position in which the second ram foot extends laterally outwardly a second distance between the first and second holding feet.

19 Claims, 10 Drawing Sheets

(56) References Cited

OTHER PUBLICATIONS

Blackhawk Automotive Bead Breaker 22910 web page on eBay, printed Jan. 31, 2016, published approx. Feb. 2011. EFS File name: 20160209_14-976217_IDS_NPL_Cite3.pdf.

Esco Combination Bead Breaker web page of Northern Tool + Equipment, printed Jan. 31, 2016, published approx. Feb. 2011. EFS File name: 20160209_14-976217_IDS_NPL_Cite4.pdf.

ESCO Manual Bead Breaker, Model# 70160 Bead Breaker web page of Northern Tool + Equipment, printed Jan. 31, 2016, published approx. Feb. 2011. EFS File name: 20160209_14-976217_IDS_NPL_Cite5.pdf.

MC135 ATV Bead Buster web page of K&L Supply Co., printed Jan. 31, 2016, published approx. Mar. 2009. EFS File name: 20160209_14-976217_IDS_NPL_Cite6.pdf.

Mov-It Tire Products Hydraulic Bead Breaker, Model# BB-501 web page of Northern Tool + Equipment, printed Jan. 31, 2016, published approx. Nov. 2008. EFS File name: 20160209_14-976217_IDS_NPL_Cite7.pdf.

Omega Hydraulic Bead Breaker, Model# 22910 web page of Northern Tool + Equipment, printed Jan. 31, 2016, published approx. Feb. 2011. EFS File name: 20160209_14-976217_IDS_NPL_Cite8.pdf.

* cited by examiner

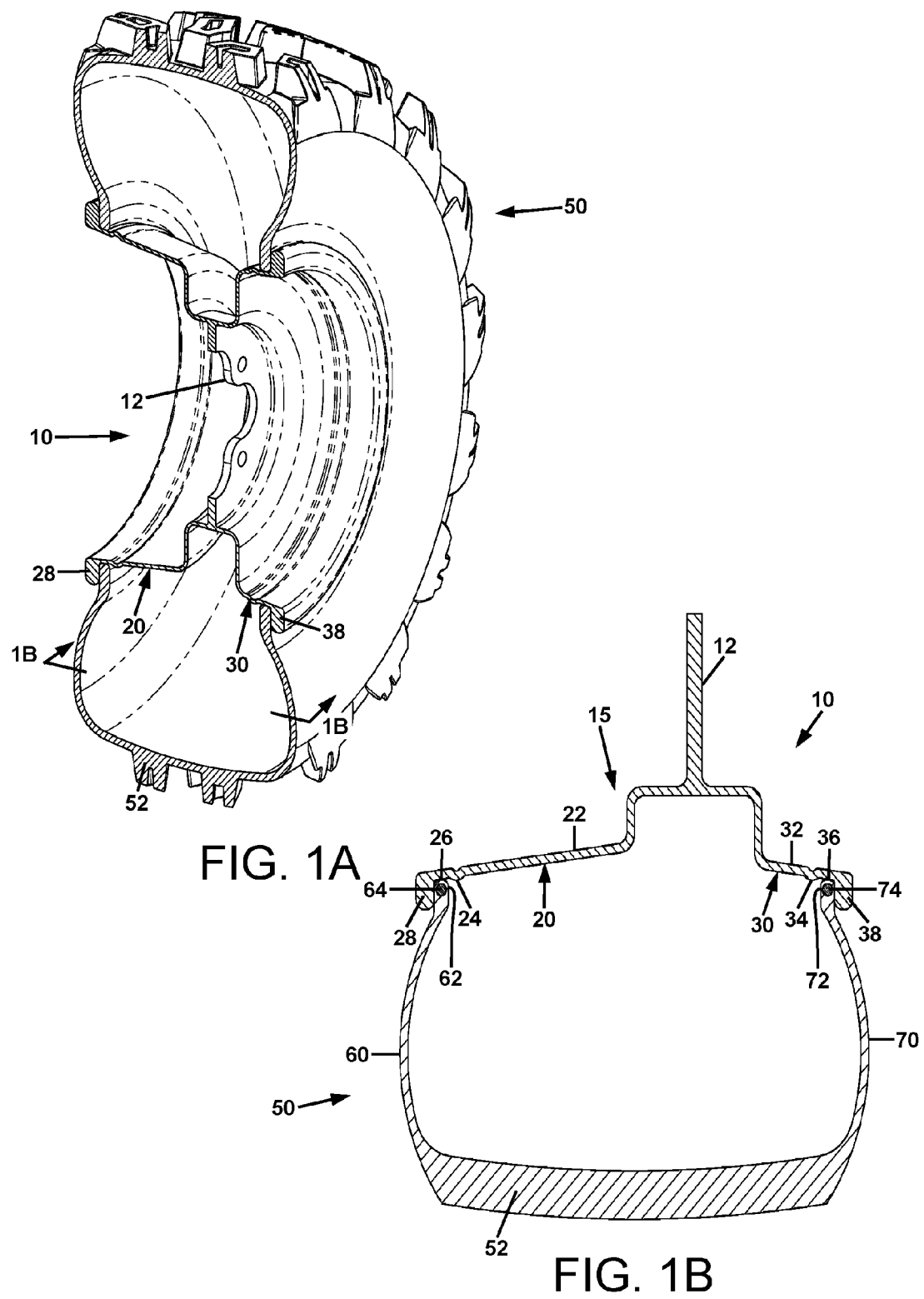

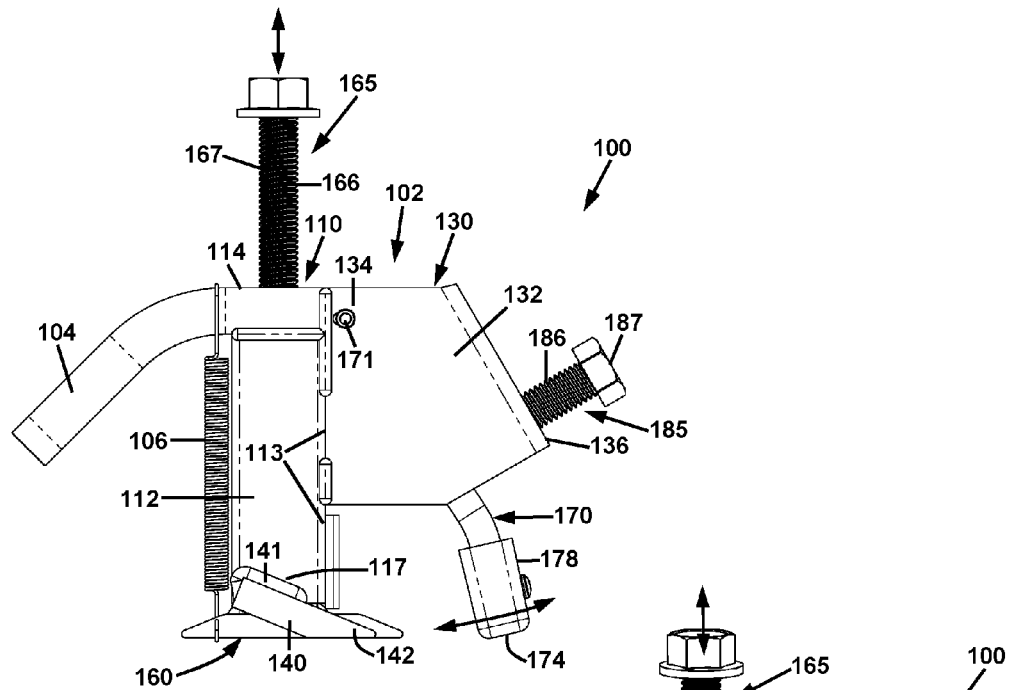
FIG. 2A
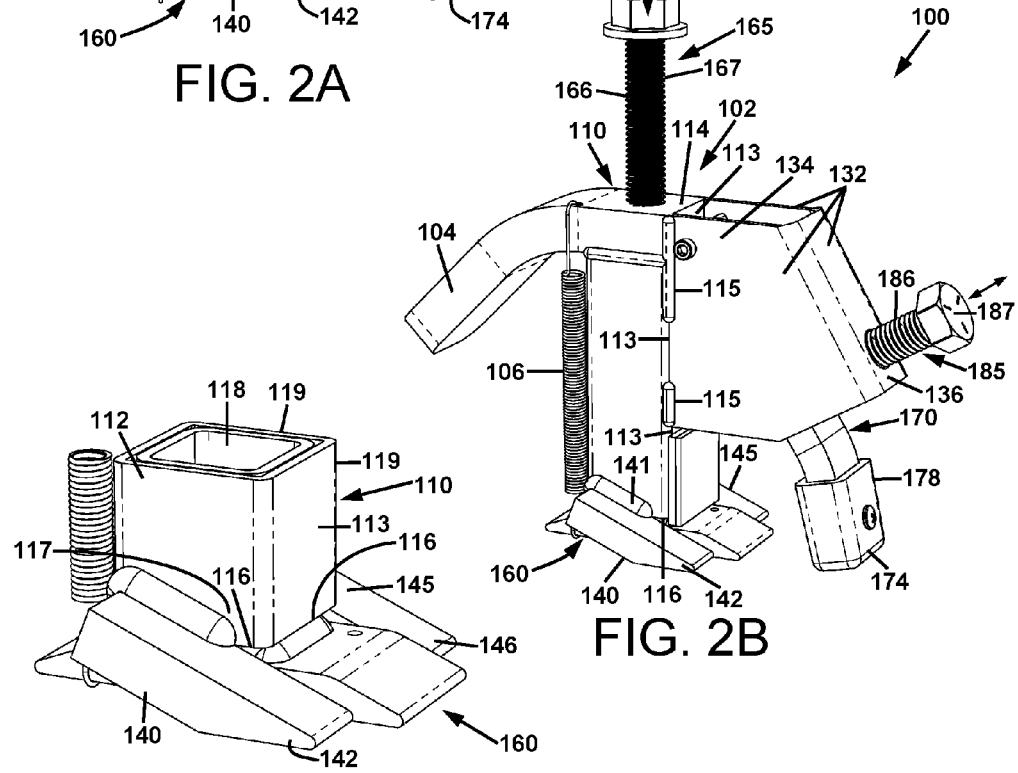
FIG. 2B
FIG. 2C

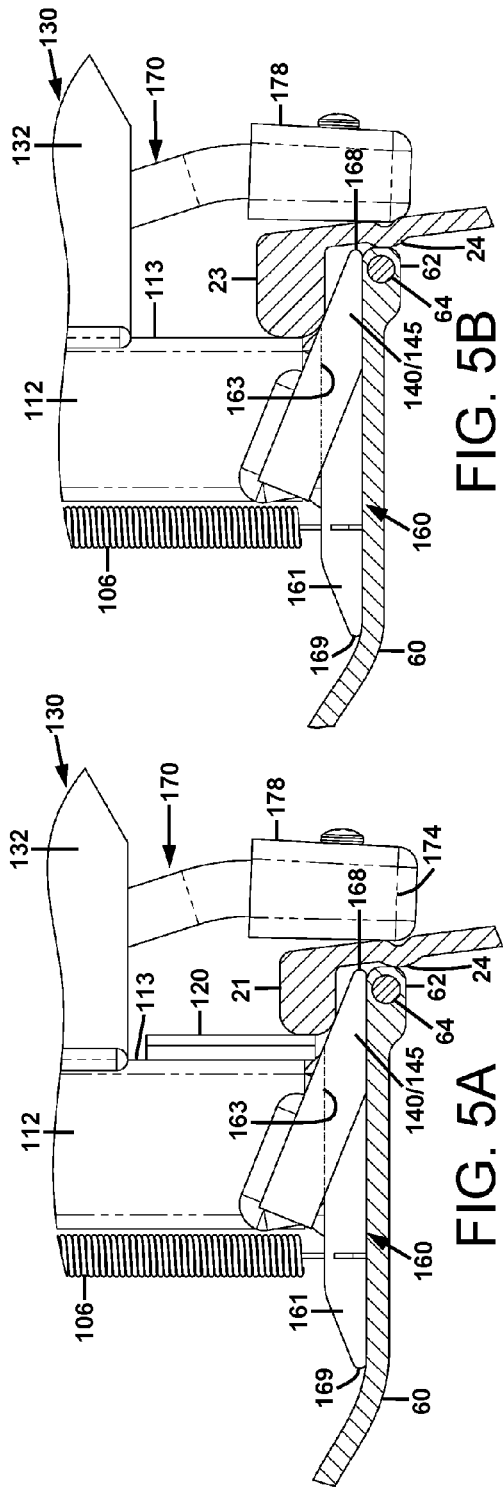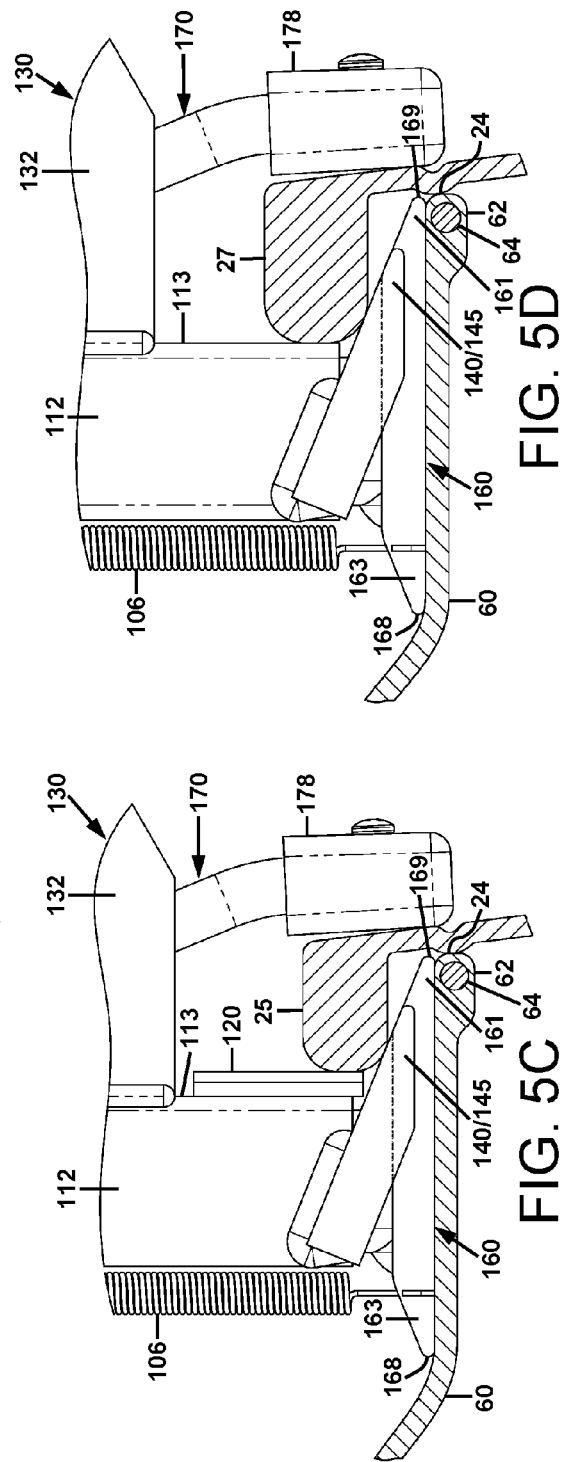

TIRE-WHEEL SEPARATION TOOL

BACKGROUND

1. Technical Field

Tools for separating tires from wheels, and in particular, tools for forcing the separation of the bead portion of a tire from the bead-retaining portion of a wheel.

2. Description of Related Art

For well over a half century, tubeless pneumatic tires have been fitted directly to wheel rims, without the need for an inflatable inner tube that serves to contain pressurized air within the tire. FIGS. 1A and 1B schematically depict a typical pneumatic tubeless tire fitted to a wheel without the need for an inner tube. The wheel 10 is formed of a suitable structural material such as metal, composite, or high strength plastic, and is comprised of a mounting disk 12 and a rim section 15. The mounting disk 12 typically includes a center hole, and a plurality of holes arrayed on a bolt circle around the center hole for receiving wheel studs on a wheel hub (not shown). Other mounting disk arrangements for joining the wheel 10 to a wheel hub are well known and need not be described here.

The rim section 15 is comprised of a first rim member 20 and a second rim member 30. The first rim member 20 is comprised of a rim body 22, a bead seat 26, and a flange 28. The first rim member may also include a bead retainer 24. In like manner, the second rim member 30 is comprised of a rim body 32, a bead seat 36, a flange 38, and optionally, a bead retainer 34. The widths of the rim bodies 22 and 32 may differ, so as to provide an offset of the mounting disc 12 between the flanges 28 and 38, which provides additional space within the rim body 22 to accommodate brake drums, discs, calipers, and other vehicle components.

The tire 50 is comprised of a tread section 52, a first side wall 60, a first bead 62 containing a first bead bundle 64, and a second bead 72 containing a second bead bundle 74. (For the sake of simplicity of illustration, tread is not shown in tread section 52 in FIG. 1B.) When fitting the tire 50 to wheel 10, the first bead 62 and bead bundle 64 are sufficiently elastic so as to enable stretching of them (using tools) over flange 28 of wheel 10. In like manner, second bead 72 and bead bundle 74 are stretched over flange 38 of wheel 10. When compressed air is delivered into the tire 50 through a valve stem (not shown) fitted in wheel 10, the beads 62 and 72 are forced laterally outwardly along rim bodies 22 and 32, and "snap into position" over respective bead retainers 24 and 34. The beads 62 and 72 thus seat in sealing contact with bead seats 26 and 36. The bead bundles 64 and 74 are typically of a material that is less elastic than the rubber of the tire, such as steel wires, and are thus under high tension. This tension provides a tight seal of the tire beads 62 and 72 to the bead seats 26 and 36 of the wheel, thus obviating the need to use a tube within the tire, as was done prior to the 1960s.

This tension in the bead bundles 64 and 74, particularly in combination with the bead retention features 24 and 34, also makes it particularly difficult to unseat the tire beads from the bead seats, and remove the tire 50 from the wheel 10 when the need arises due to tread wear or puncturing of the tire. Modern tire changing equipment is effective for changing tires on typically sized car and truck wheels. However, such equipment is not capable of changing tires on rims which have pronounced bead retainers such as all-terrain vehicles (ATVs). Additionally, because of the stressful conditions in off-road use, ATV and other off-road wheels have particularly pronounced bead retention features that protrude from the rim bodies and serve to hold the tire bead in place in the event of loss of air pressure.

The need for changing ATV tires often arises "in the field," away from a well-equipped tire store or vehicle service center that has expensive and complex pneumatic and hydraulic tools for changing a tire. Such tools are not available in remote locations where ATVs are used and may suddenly need tire service. Moreover, changing ATV/UTV tires is extremely difficult to do with existing hand operated tire changing tools available to the typical consumer. The bead retention features make changing the tire very difficult with conventional hand tools (such as hammers, pry bars, etc.), or existing hand operated tire changing tools, since the tire beads must be stretched over the retention features to remove the tire from the wheel. As a result, many "do-it yourself" (DIY) mechanics are forced to struggle with dangerous, damaging, and ineffective methods of breaking ATV tire beads, or they must resort to paying large service fees to get tires changed at dealerships or service stations.

Existing tire changing tools available for this task have flaws compared to an ideal solution. They do not work well on relatively small ATV wheels, and/or the tools are large and not portable, and/or they are complicated and difficult to use, and/or they cause damage to the wheels, and/or they are prohibitively expensive due to their complex construction.

Additionally, there is considerable variation in the dimensions of wheels and tires used on ATVs and other small vehicles. Referring again to FIG. 1B, the depths of the flanges 28 and 38 of the wheel 10 may vary widely among wheel manufacturers, and the shapes of the tire sidewalls 60 and 70 may also vary, depending on the width of the wheel 10 on which the tire 50 is mounted. In a tire changing tool, this variability must be accommodated. If the variability is not accommodated, I.e., if a "one size fits all" bead breaking tool is used on a wheel and tire of an incompatible size, damage to the wheel in the form of a gouge, crack, or other defect will likely result. The wheel may be rendered unusable, because it will not seal properly to a new tire.

Accordingly, there remains a need for a tire changing tool, which can separate the bead portion of a tire from the bead-retaining portion of a wheel, and which is simple, inexpensive, safe to use, portable, and effective across a range of tire and wheel geometries.

SUMMARY

In accordance with the present disclosure, a tire changing tool is provided which meets this need. The tire changing tool includes certain features that enable custom sizing of the tool to match the tire and wheel to be separated. The tire changing tool may also include features that improve its strength and reliability.

More specifically, a tire changing tool is provided comprising a tool body, a ram, a ram actuator, a clamp arm, and a clamp actuator. The tool body is comprised of a housing, a lateral bracket, and first and second holding feet. The housing is comprised of a side wall having an upper end and a lower end, and surrounding an inner cavity of a defined cross-sectional shape. The lateral bracket is joined to a first portion of the side wall of the housing and is comprised of a bracket wall including an upper region. The first holding foot is joined to a second portion of the side wall of the housing proximate to the lower end of the housing and comprises a wedge portion extending laterally outwardly from the second portion of the side wall past the first portion of the side wall of the housing and beneath the lateral bracket. In like manner, the second holding foot is joined to a third portion of the side wall of the housing proximate to the lower end of the housing, and comprises a wedge portion extending laterally outwardly from the second portion of the side wall past the first portion of the side wall of the housing and beneath the lateral bracket. In use of the tool on a tire and wheel, the wedge portions of the first and second holding feet and ram base are forced between a bead of the tire and a flange of the wheel to form a gap between the bead and flange.

The ram is comprised of a ram body and a ram base. The ram body has a side wall, an upper end, and a lower end, and is disposed in the inner cavity of the housing, with a cross-sectional shape corresponding to the cross-sectional shape of the housing, so as to be slidable within the cavity of the housing. The ram base is joined to the lower end of the ram body and comprises a first ram foot extending laterally outwardly a first distance past a first portion of the side wall of the ram body, and a second ram foot extending laterally outwardly a second distance past a second portion of the side wall of the ram body opposed to the first portion of the side wall of the ram body. In use of the tool on a tire and wheel, the ram base contacts the side wall of the tire.

The ram body is removable from the inner cavity of the housing, and is rotatable and replaceable in the inner cavity of the housing. Thus prior to fitting the tool to the tire and wheel, the position of the ram base may be selected between a first position in which the first ram foot extends laterally outwardly the first distance between the first and second holding feet of the tool body, or a second position in which the second ram foot extends laterally outwardly the second distance between the first and second holding feet of the tool body. By selecting which ram foot extends between the first and second holding feet of the tool body, damage to the bead seat, rim member and/or the rim body by the edge of the ram foot may be avoided, as will be explained in detail subsequently.

The ram actuator is connected to the upper end of the housing and is comprised of a ram rod engaged with the upper end of the ram body. In use of the tool on a tire and wheel, the ram actuator is operated so as to displace the ram body downwardly within the inner cavity of the housing and to displace the ram base downwardly away from the lower end of the housing, thus displacing the tire sidewall downwardly, and causing the tire bead to slide downwardly over the bead retainer ridge of the wheel. In certain embodiments, the ram rod of the ram actuator may be a bolt threadably engaged with the upper end of the housing. In such embodiments, rotation of the bolt in a first direction causes a distal end of the bolt to contact the upper end of the ram body and displace the ram base downwardly away from the lower end of the housing and to drive the tire sidewall and tire bead downwardly over the bead retainer ridge of the wheel.

The clamp arm is comprised of an upper end pivotably joined to the upper region of the lateral bracket, and a lower end pivotable from a first position distal from the first and second holding feet of the tool body to a second position proximal to the first and second holding feet. The clamp actuator is connected to a lower portion of the lateral bracket and comprises a clamp rod engaged with a central region of the clamp arm. At the beginning of use of the tool on a tire and wheel, the wedge portions of the first and second holding feet and ram base are forced between the bead of the tire and the flange of the wheel using the clamp actuator. The clamp actuator is operated so as to pivot the lower end of the clamp arm from an open position distal from the first and second holding feet to a clamping position proximal to the first and second holding feet. In certain embodiments, the clamp rod of the clamp actuator may be a bolt threadably engaged with the bracket wall of the lateral bracket. In such embodiments, rotation of the bolt in a first direction causes a distal end of the bolt to contact the central region of the clamp arm and pivot the lower end of clamp arm toward the first and second holding feet.

In certain embodiments, the tool may be further comprised of a spacer plate disposed on the side wall of the housing beneath the lateral bracket. The spacer plate is contactable with the flange of the wheel so as to limit the distance that the wedge portions of the first and second holding feet and the edge of the ram foot between them extend between the bead of the tire and the flange of the wheel when the tool is in use on the tire and wheel. In that manner, damage to the bead seat, rim member and/or the rim body by the edge of the ram foot is avoided, as will be explained in detail subsequently.

In certain embodiments, the upper end of the clamp arm of the tool is pivotably joined to the upper region of the lateral bracket by a pin extending laterally through the upper end of the clamp arm, and comprising a first pin end disposed in a first slot in the bracket wall, and a second pin end disposed in a second slot in the bracket wall. The use of a pivot pin in a pair of supporting slots is advantageous, as it results in less stress on the pivot pin during use of the tool, as will be explained subsequently.

In certain embodiments, the ram base may be joined to the lower end of the ram body by a pair of welds consisting of a first longitudinal weld joining a first upper lateral edge of the ram base to a first lower lateral edge of the lower end of the ram body, and a second longitudinal weld joining a second upper lateral edge of the ram base to a second lower lateral edge of the lower end of the ram body. The first upper lateral edge of the ram base is opposed to the second upper lateral edge of the ram base, and the first lower lateral edge of the lower end of the ram body is opposed to the second lower lateral edge of the lower end of the ram body. In such an embodiment, no transverse welds across the ram base are used to join it to the ram body. Such a weld configuration is advantageous in providing a strong bond of the ram base to the ram body, while enabling the full range of motion of the ram body within the tool housing, as will be described subsequently.

In an alternative embodiment of the tire tool, the ram may be provided with a ram base comprising an adjustable ram foot. In such an embodiment, the ram base is comprised of a ram foot actuator engaged with the ram foot and operable to adjust the distance the ram foot extends laterally between the first and second hold feet of the tool.

BRIEF DESCRIPTION OF THE DRAWINGS

The present disclosure will be provided with reference to the following drawings, in which like numerals refer to like elements, and in which:

FIG. 1A is a cutaway illustration of a tubeless tire fitted to a wheel, the beads of the tire being separable from the rim body of the wheel using the tire tool of the present disclosure;

FIG. 1B is a detailed cross sectional view of the tire and wheel taken along line 1B-1B of FIG. 1A;

FIG. 2A is a side elevation view of the tire tool of the present disclosure;

FIG. 2B is an upper perspective view of the tire tool of FIG. 2A;

FIG. 2C is a detailed perspective view depicting a cutaway of the tool body and a pair of holding feet joined to the housing of the tire tool;

FIGS. 5A-5D are side elevation views of the tire tool set up in different configurations that accommodate tires fitted to wheels having different flange depths;

Figure 2D:
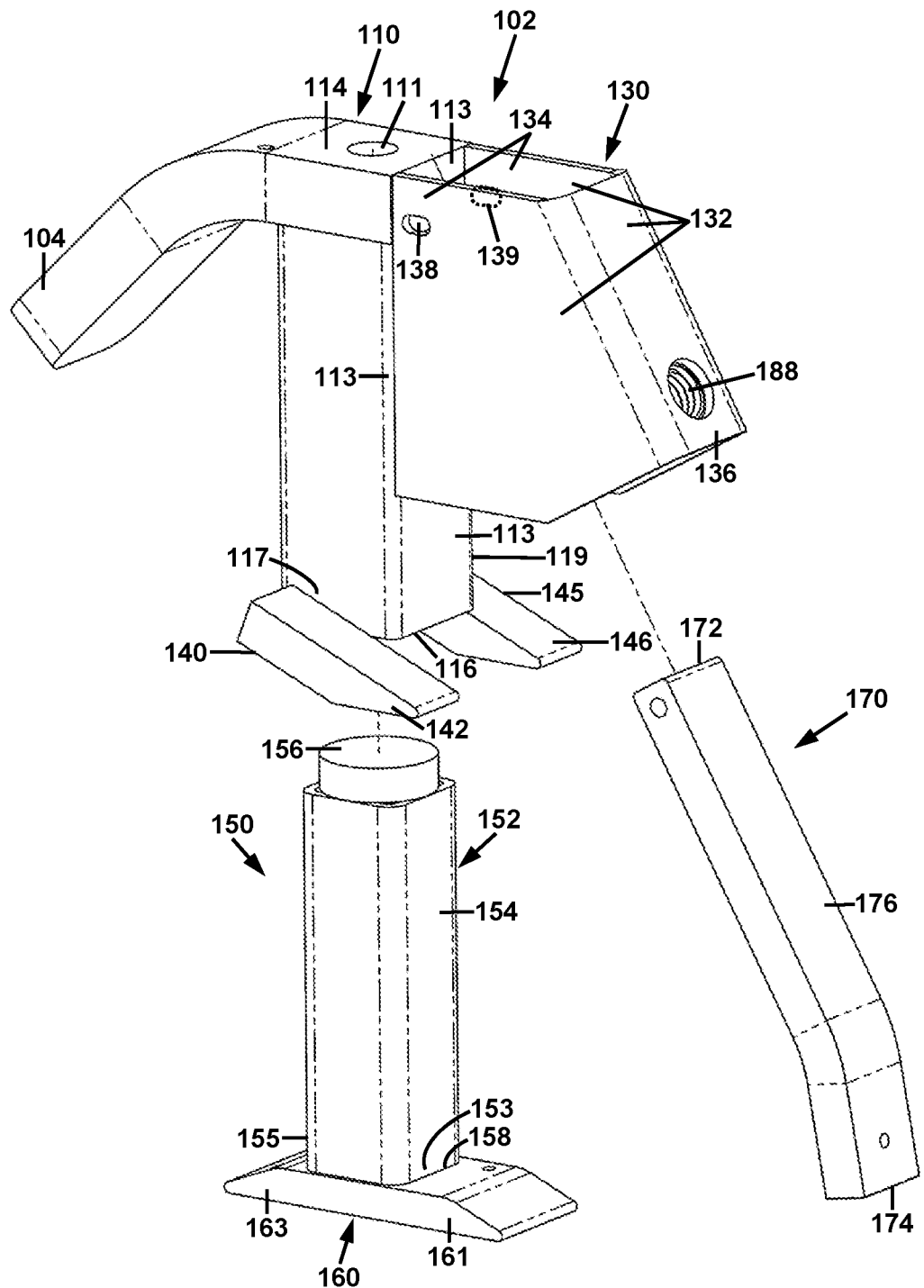
FIG. 2D is an exploded perspective view of several major components of the tire tool of FIGS. 2A and 2B.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may be identified with the adjectives "top," "upper," "bottom," "lower," "left," "right," "inner," "outer," etc. These adjectives are provided in the context of the orientations shown in the drawings, which is arbitrary. The description and drawings are not to be construed as limiting the tire tool invention to use in a particular spatial orientation. The instant tire tool may be used in orientations other than those shown and described herein.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

Turning now to FIGS. 2A-2D, one embodiment of the instant tire tool is depicted in various views as described previously. The tire tool 100 is comprised of a tool body 102, a ram 150, a ram actuator 165, a clamp arm 170, and a clamp actuator 185. The tool body 102 is comprised of a housing 110, a lateral bracket 130, and first and second holding feet 140 and 145. The housing 110 is comprised of a side wall 112 having an upper end 114 and a lower end 116, the side wall 112 surrounding an inner cavity 118 of a defined cross-sectional shape. The lateral bracket 130 is joined to a first portion 113 of the side wall of the housing, such as by welds 115, and is comprised of a bracket wall 132 including an upper region 134.

The first holding foot 140 is joined by suitable means such as weld 141 to a second portion 117 of the side wall 112 of the housing 110 proximate to the lower end 116 of the housing 110, and comprises a wedge portion 142 extending laterally outwardly from the second portion 117 of the side wall 112 past the first portion 113 of the side wall 112 of the housing 110 and beneath the lateral bracket 130. In like manner, the second holding foot 145 is joined to a third portion 119 of the side wall 112 of the housing 110 proximate to the lower end 116 of the housing 110, and comprises a wedge portion 146 extending laterally outwardly from the third portion 119 of the side wall 112 past the first portion 113 of the side wall 112 and beneath the lateral bracket 130. In use of the tool on a tire 50 and wheel 10 of FIG. 1A, as depicted in FIG. 3B, the wedge portions 142 and 146 of the first and second holding feet 140 and 145 are forced between a bead 62 of the tire 50 and a flange 28 of the wheel 10 to form a gap between the bead 62 and flange 28. In an alternative embodiment (not shown), the holding feet 140 and 145 may have an upward arcuate shape, rather than trapezoidal as depicted in FIG. 2C.

The ram 150 is comprised of a ram body 152 and a ram base 160. The ram body 152 has a side wall 154, an upper end 156, and a lower end 158, and is disposed in the inner cavity 118 of the housing 110. The ram body 152 has a cross-sectional shape corresponding to the cross-sectional shape of the cavity 118 of the housing 110, so as to be slidable within the cavity 118 of the housing 110, but not rotatable therein. In the embodiments depicted in the various FIGS., the ram body 152 has a square cross-section, and the cavity 118 also has a square cross-section so as to permit axial sliding of the ram body 152 in the cavity 118 while preventing rotation of the ram body 152 in the cavity 118. Other cross-sectional shapes are contemplated, including but not limited to rectangular shapes, other polygonal shapes, and matched cylindrical shapes that include a key extending from the ram body 152 fitted to a corresponding key slot in the cavity 118.

Figure 3B:
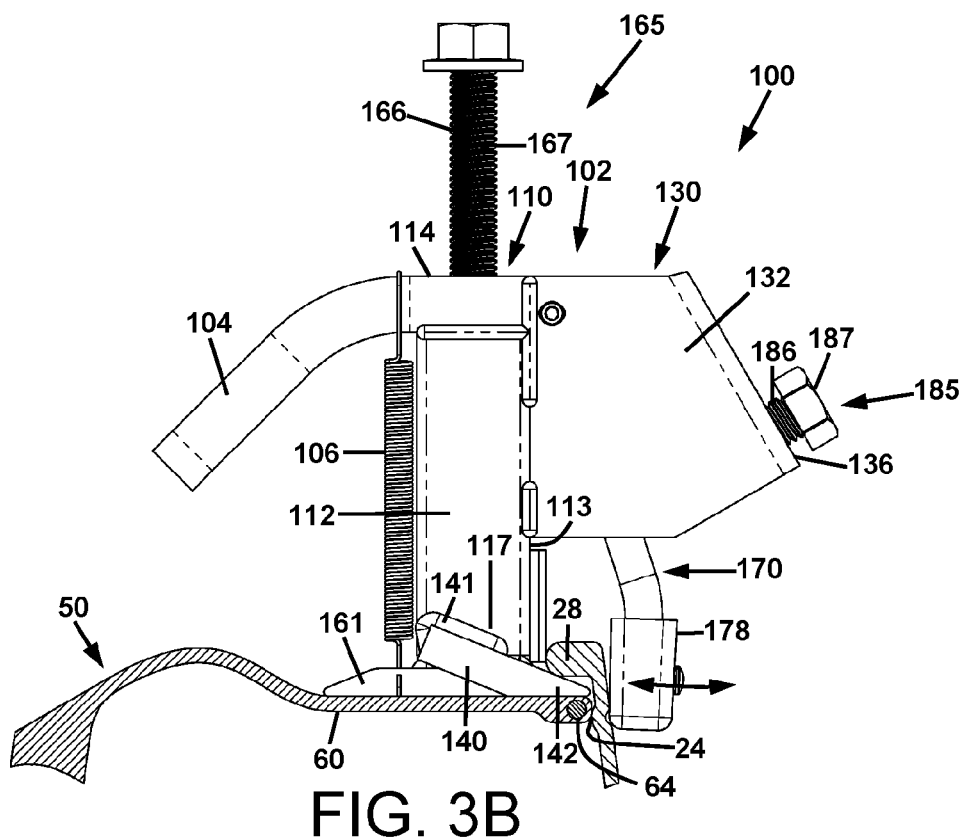
FIG. 3B is side elevation view of the tire tool in the configuration shown in FIG. 3A, but with the holding feet and "short ram foot" of the tool forced between a tire bead and a rim flange, and ready to drive the tire sidewall and bead downwardly over the bead retainer of the wheel.
Figure 4A:
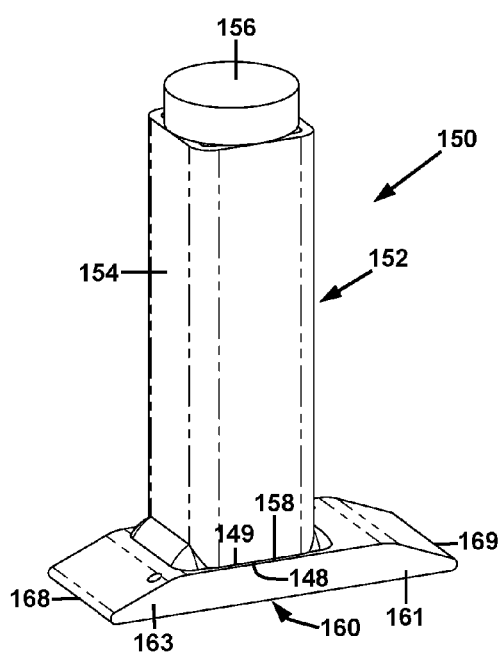
FIGS. 4A and 4B are respective upper perspective and side elevation views of a ram of the tool, showing the base having opposed first and second ram feet extending beyond the side wall of the ram body to different extents.
Figure 4B:
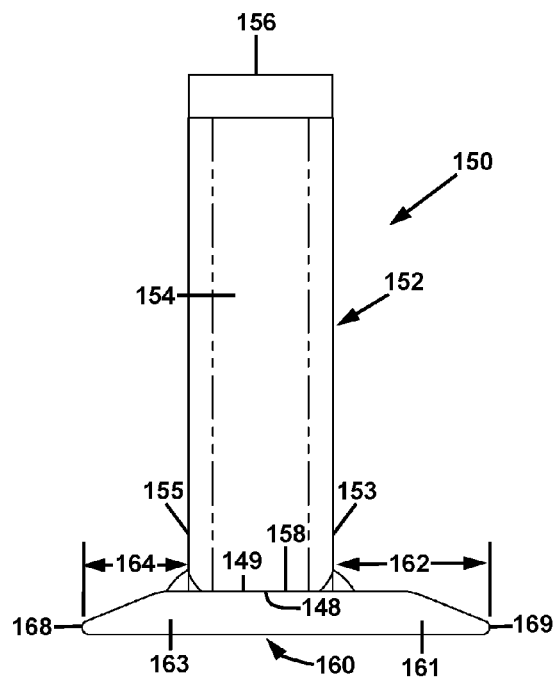

Referring in particular to FIGS. 2D, 4A, and 4B, the ram base 160 is joined to the lower end of the ram body 152 and comprises a first ram foot 161 extending laterally outwardly a first distance 162 past a first portion 153 of the side wall 154 of the ram body 152, and a second ram foot 163 extending laterally outwardly a second distance 164 past a second portion 155 of the side wall 154 of the ram body 152 that is opposed to the first portion 153 of the side wall 154 of the ram body 152. In use of the tool 100 on a tire 50 and wheel 10 as depicted in FIG. 3B and FIGS. 5A-5D, the ram base 160 contacts the side wall 60 of the tire 50.

The ram body 152 is removable from the inner cavity 118 of the housing 110, and is rotatable and replaceable in the inner cavity 118 of the housing 110. Thus prior to fitting the tool 100 to the tire 50 and wheel 10, the ram base 160 may be disposed in a first position in which the first ram foot 161 extends laterally outwardly the first distance 162 between the first and second holding feet 140 and 145 of the tool body 102. This first position of the ram base 160 relative to the first and second holding feet 140 and 145 is depicted in FIGS. 2A-2D and FIG. 4D.

Figure 4C:
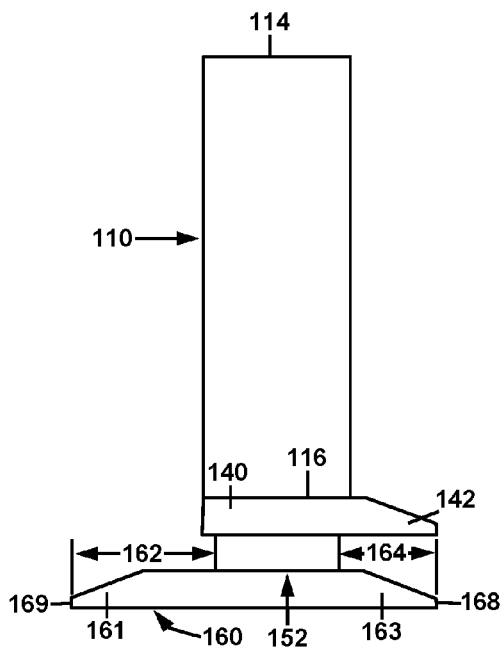
FIG. 4C is a schematic view of the ram of FIGS. 4A and 4B shown inserted into the tool body in a first position with the short ram foot being engageable between the tire bead and rim flange.
Figure 4D:
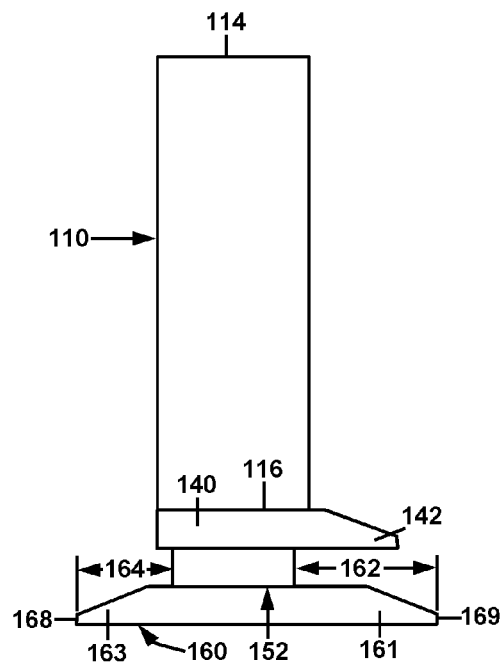
FIG. 4D is a schematic view of the ram of FIGS. 4A and 4B shown inserted into the tool body in a second position rotated 180 degrees from the position of FIG. 4C, with the long ram foot being engageable between the tire bead and rim flange.

Alternatively, as depicted in FIGS. 3B and 4C, the ram body 152 may be rotated 180 degrees such that the ram base 160 is disposed in a second position in which the second ram foot 163 extends laterally outwardly the second distance 164 between the first and second holding feet 140 and 145 of the tool body 102. By selecting which ram foot 161 or 163 extends between the first and second holding feet 140 and 145 of the tool body 102, damage to the bead seat, rim member and/or the rim body by the edge of the ram foot may be avoided, as will be explained in detail subsequently.

Referring again to FIGS. 2A-2D, the ram actuator 165 is connected to the upper end 114 of the housing 110, and is comprised of a ram rod 166 engaged with the upper end 156 of the ram body 152. In use of the tool 100 on a tire 50 and wheel 10, the ram actuator 165 is operated so as to displace the ram body 152 downwardly within the inner cavity 118 of the housing 110, and to displace the ram base 160 downwardly away from the lower end 116 of the housing 110, thus displacing the tire sidewall 60 downwardly, and causing the tire bead 62 to slide downwardly over the bead retainer ridge 24 of the wheel 10. This will be explained in further detail subsequently.

In certain embodiments, the ram rod 166 of the ram actuator 165 may be a bolt 167 threadably engaged with the upper end 114 of the housing 110. The upper end 114 of the housing 110 may include tapped threads 111, or a nut (not shown) welded thereto for threaded engagement with the bolt 167. In such embodiments, rotation of the bolt 167 in a first direction causes a distal end of the bolt 167 to contact the upper end 156 of the ram body 152 and displace the ram base 160 downwardly away from the lower end 116 of the housing 110 and to drive the tire sidewall 60 and tire bead 62 downwardly over the bead retainer ridge 24 of the wheel 10.

Figure 3A:
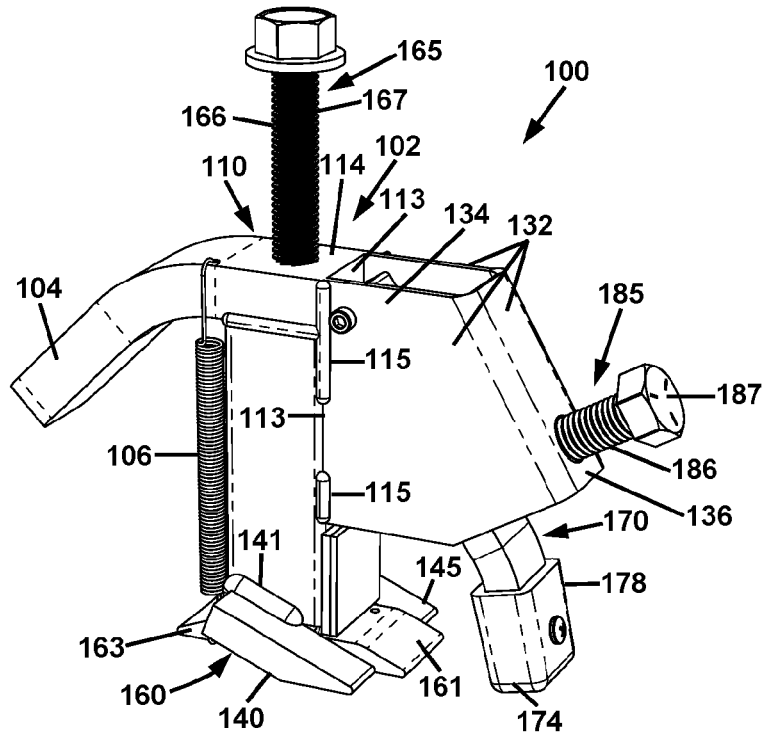
FIG. 3A is an upper perspective view of the tire tool as shown in FIG. 2B, with the "long ram foot" of the tool engageable between the flange of a wheel and a tire bead.

The clamp arm 170 is comprised of an upper end 172 pivotably joined to the upper region 134 of the lateral bracket 130, and a lower end 174 pivotable from a first position distal from the first and second holding feet 140 and 145 of the tool body 102 as shown in FIGS. 2A, 2B, and 3A, to a second position proximal to the first and second holding feet 140 and 145 as shown in FIG. 3B and FIGS. 5A-5D. The clamp actuator 185 is connected to a lower portion 136 of the lateral bracket 130 and comprises a clamp rod 186 engaged with a central region 176 of the clamp arm 170. At the beginning of use of the tool 100 on a tire 50 and wheel 10, the wedge portions 142 and 146 of the first and second holding feet 140 and 145 and the ram foot 161 or 163 are forced between the bead 62 of the tire 50 and the flange 28 of the wheel 10 using the clamp actuator. The clamp actuator 185 is operated so as to pivot the lower end 174 of the clamp arm 170 from an open position distal from the first and second holding feet 140 and 145 to a clamping position proximal to the first and second holding feet 140 and 145 of the tool body. The clamping action of the clamp arm 170 forces the wedge portions 142 and 146 of the first and second holding feet 140 and 145 and the ram foot 161 or 163 between the bead 62 of the tire 50 and the flange 28 of the wheel 10. Additionally, the clamping action of the clamp arm 170 also operates to align the tool 100 so that the ram body 152 is substantially perpendicular to the side wall 60 of the tire 50. In that manner, optimal driving of the tire sidewall 60 downwardly, and displacement of the bead 62 over the bead retainer 24 is attained.

In certain embodiments, the clamp rod 186 of the clamp actuator 185 may be a bolt 187 threadably engaged with the lower portion 136 of the lateral bracket 130. The lower portion 136 may include tapped threads (not shown), or a nut 188 welded thereto for threaded engagement with the bolt 187. In such embodiments, rotation of the bolt 187 in a first direction causes a distal end of the bolt 187 to contact the central region 176 of the clamp arm 170 and pivot the lower end 174 of clamp arm 170 toward the first and second holding feet 140 and 145 of the tool body 102.

The use of the tire tool 100 in separating the bead 62 of a tire 50 from a wheel 10 will now be described, with reference in particular to FIGS. 5A-5D and FIG. 6. FIGS. 5A-5D are side elevation views of the tire tool 100 set up in different configurations that accommodate tires fitted to wheels having different flange depths. Looking at FIGS. 5A-5D in sequence, it can be seen that the tire is mounted on wheels having different dimensions. In particular, the flanges 21, 23, 25, and 27 increase in size. Using a "one size fits all" tire tool that has no adjustment capability to accommodate different wheel flange sizes causes operational problems. One problem is that if the ram foot of the tire tool 100 is too short, then it will not extend sufficiently into the gap that is formed between the tire side wall 60 and the flange when the hold feet 140 and 145 of the tool 100 are forced between them at the start of tool use. More specifically, if the ram foot is too short, it will not extend sufficiently to be directly above the bead bundle 64 of the tire, and thus will not be effective in forcing the bead 62 downwardly over the bead retainer 24 of the wheel 10. On the other hand, if the ram foot is too long, it will extend to a point where it is in contact with the bead seat 26 and/or bead retainer 24 of the wheel 10. In that case, when the ram 150 of the tool 100 is actuated downwardly to drive the bead 62 over the bead retainer 24, the ram foot will scrape along the bead seat and/or bead retainer surface and damage them. Even a small scrape can damage these surfaces to a point where the next tire to be fitted to the wheel will not seal properly, rendering the wheel in need of repair, or even useless if the damage is severe.

The tire tool 100 is provided with features that solve these problems, such that prior to ram actuation, the ram foot of the tool is in proper vertical alignment with the tire bead while not being in contact with the wheel. Referring to FIGS. 5A-5D, in each of the instances of use of the tire tool 100, the use of the tool begins by forcing the hold feet 140/145 between the tire side wall 60 and the wheel flange. The tire is first deflated, and the initial positioning of the hold feet 140/145 occurs by hand. The tool 100 may be provided with a leverage handle 104 for gripping with the user's hand (not shown) to facilitate engaging the hold feet 140/145. The clamp actuator 185 is then operated to pivot the clamp arm 170 to the closed position shown in FIGS. 5A-5D and FIG. 6, thereby forcing the first and second holding feet 140 and 145 and the ram base 160 completely between the tire side wall 60 and the wheel flange, and also clamping the tool 100 in a fixed position so that the ram 150 can be operated without any movement of the tool body 110. The lower end 174 of the clamp arm 170 may be provided with a compliant cap 178 to prevent damage to the exterior surface of the wheel 10. The clamp actuator 185 may be a bolt 187 as shown in FIGS. 2A-2B and 3A-3B, in which case, the bolt 187 may be rotated with pliers, a bar wrench, ratchet wrench, or pneumatic socket wrench.

Referring to FIG. 5A, the tire tool 100 is fitted to a wheel having a relatively small flange 21. The ram 150 is disposed in the cavity 118 of the body 110 in the position depicted in FIG. 4C, with the shorter ram foot 163 extending between the hold feet 140 and 145 into the gap between the flange 21 and the tire side wall 60. Additionally, the tool 100 is further comprised of a spacer plate 120 disposed on the side wall 113 of the housing 110 beneath the lateral bracket 130. The spacer plate 120 acts as a shim, contacting the flange 21 of the wheel so as to limit the distance that the first and second holding feet 140 and 145 and the outer edge 168 of the ram foot 163 extend between the bead 62 of the tire 50 and the flange 21 of the wheel 10. In particular, it can be seen that the outer edge 168 of the ram foot 163 extends just beyond the bead bundle 64 of the tire 50, but does not touch the wheel. In that manner, damage to the wheel when the ram 150 is actuated downwardly to unseat the bead 62 is prevented. The spacer 120 can be magnetically attached to the top portion of the clamp arm when not being used.

Referring to FIG. 5B, the tire tool 100 is fitted to a wheel having a slightly larger flange 23. Again, the ram 150 is disposed in the cavity 118 of the body 110 in the position depicted in FIG. 4C, with the shorter ram foot 163 extending between the hold feet 140 and 145 into the gap between the flange 23 and the tire side wall 60. However, because of the larger size of the flange, the spacer 120 is not needed. Again, it can be seen that in this configuration with this particular sized flange 23, the outer edge 168 of the ram foot 163 extends just beyond the bead bundle 64 of the tire 50, but does not touch the wheel.

Referring to FIG. 5C, the tire tool 100 is fitted to a wheel having a relatively large flange 25. The ram 150 is disposed in the cavity 118 of the body 110 in the position depicted in FIG. 4D, with the longer ram foot 161 extending between the hold feet 140 and 145 into the gap between the flange 25 and the tire side wall 60. Additionally, the spacer plate 120 of the tool 100 is disposed on the side wall 113 of the housing 110, contacting the flange 21 of the wheel so as to limit the distance that the outer edge 169 of the ram foot 161 extends between the bead 62 of the tire 50 and the flange 25. Again, it can be seen that the outer edge 169 of the ram foot 161 extends just beyond the bead bundle 64 of the tire 50, but does not touch the wheel.

Referring to FIG. 5D, the tire tool 100 is fitted to a wheel having an even larger flange 27. Again, the ram 150 is disposed in the cavity 118 of the body 110 in the position depicted in FIG. 4D, with the longer ram foot 161 extending between the hold feet 140 and 145 into the gap between the flange 27 and the tire side wall 60. Because of the larger size of the flange, and with the longer ram foot 161 in use, the spacer 120 is not needed. Again, it can be seen that in this configuration, the outer edge 169 of the ram foot 161 extends just beyond the bead bundle 64 of the tire 50, but does not touch the wheel.

Figure 6:
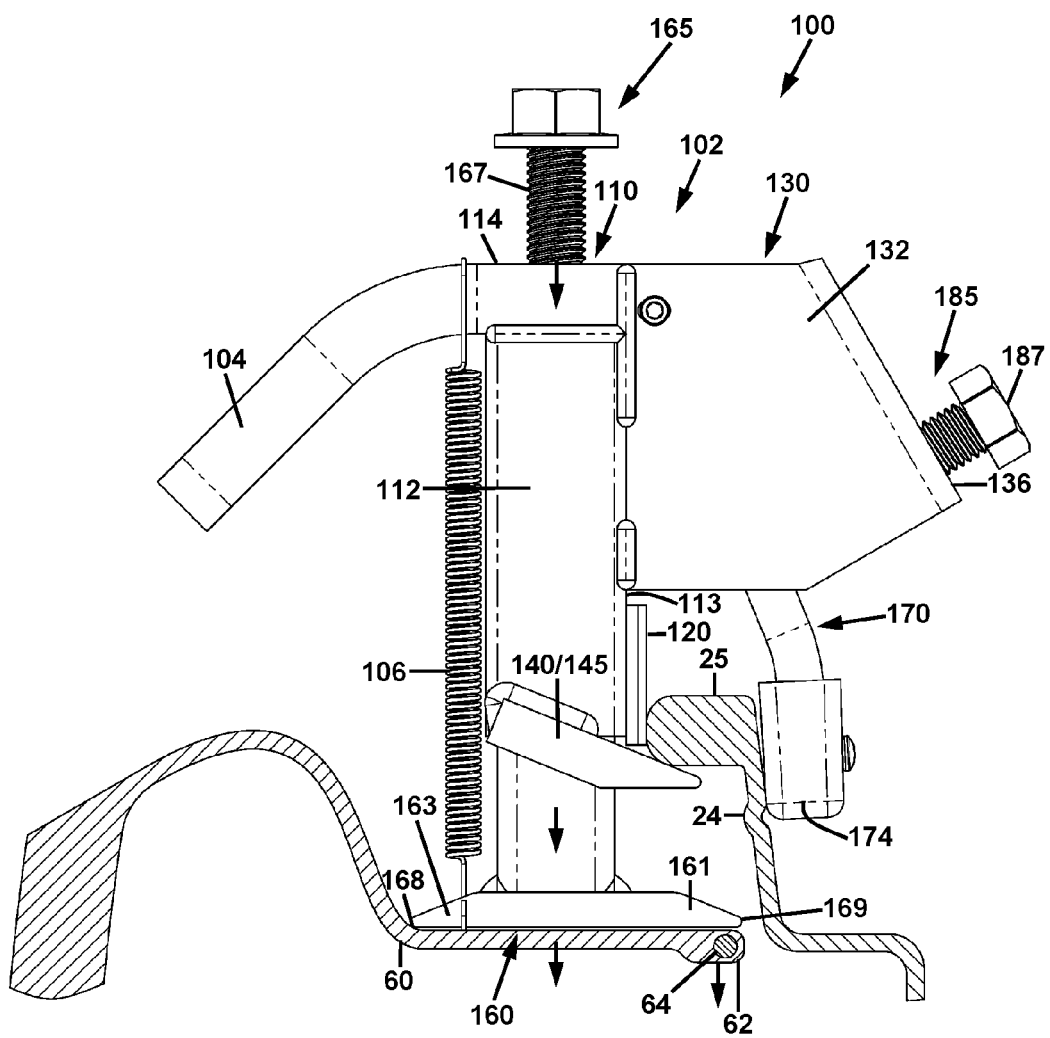
FIG. 6 is a side elevation view of the tire tool in the configuration shown in FIG. 5C, but with the ram deployed downwardly and having driven a tire bead over a bead retainer of the wheel.

FIG. 6 depicts a side elevation view of the tire tool 100 in the configuration shown in FIG. 5C, but with the ram 150 deployed downwardly by the actuator 165 and having driven the tire bead 62 over the bead retainer 24 of the wheel. It can be seen that the outer edge 169 of the ram foot 161 has moved downwardly without contacting and damaging the wheel 10.

To release the tool 100 from the tire 50 and wheel 10, the actuators 165 and 185 are retracted. A spring 106 may be joined to the body 110 and the ram 150 to assist in retraction of the ram 150 within the cavity 118 of the body 110. To complete the separation of the bead 62 from the wheel 10, the tool may be moved to a different circumferential location on the wheel 10 and tire 50, and the process repeated. Typically, three to four iterations of tool operation are sufficient to fully unseat the tire bead 62 from the wheel 10.

Figure 7A:
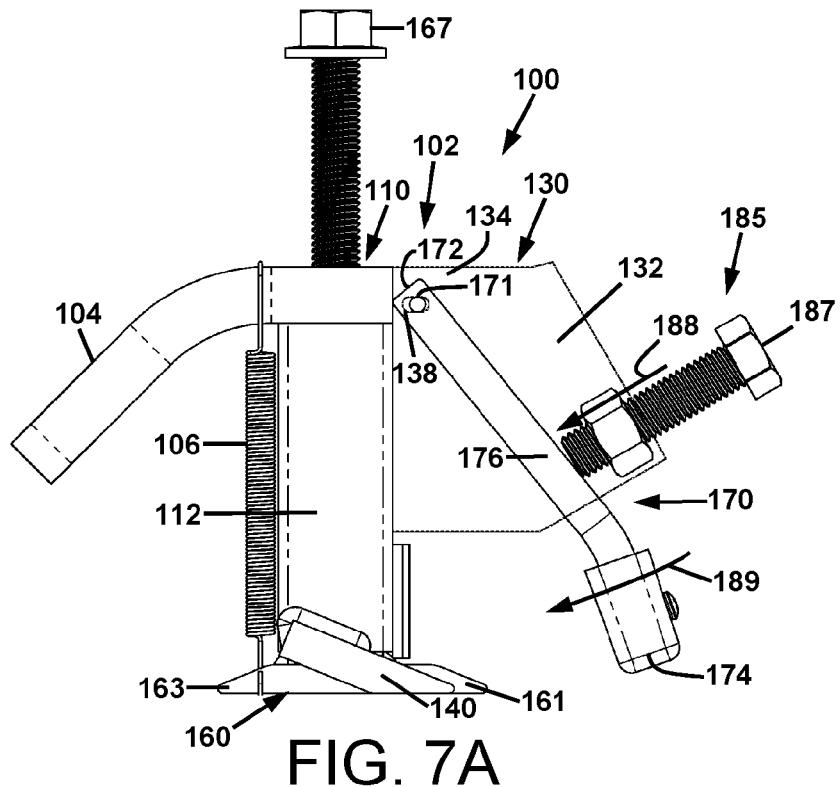
FIG. 7A is a side cross-sectional view of the tool depicting the clamp arm pivotably joined to the lateral bracket of the tool at a horizontal slot, and in the open position.
Figure 7B:
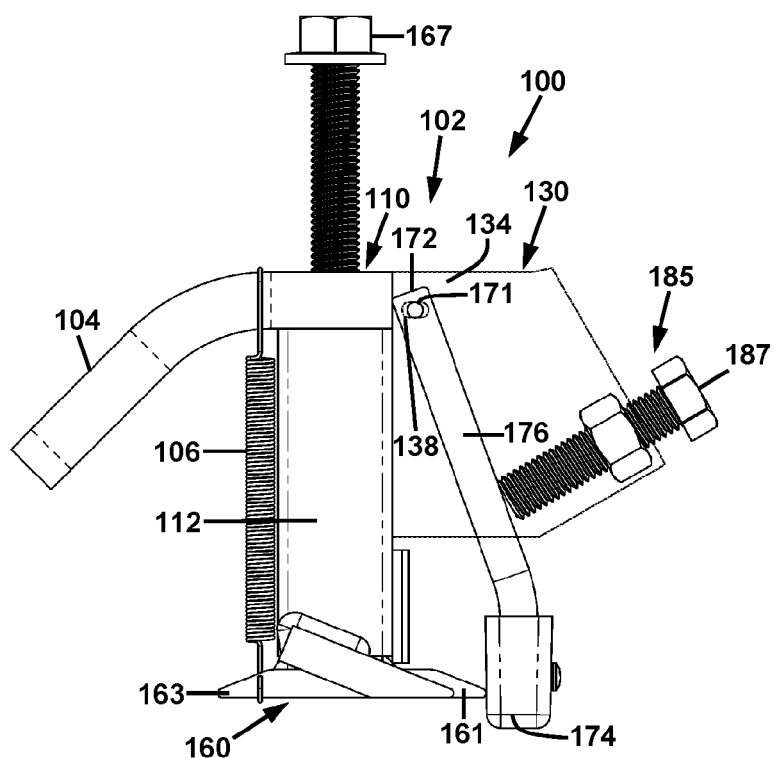
FIG. 7B is a side cross-sectional view of the tool as shown in FIG. 7A, but with the clamp arm pivoted to the clamping position.
Figure 7C:
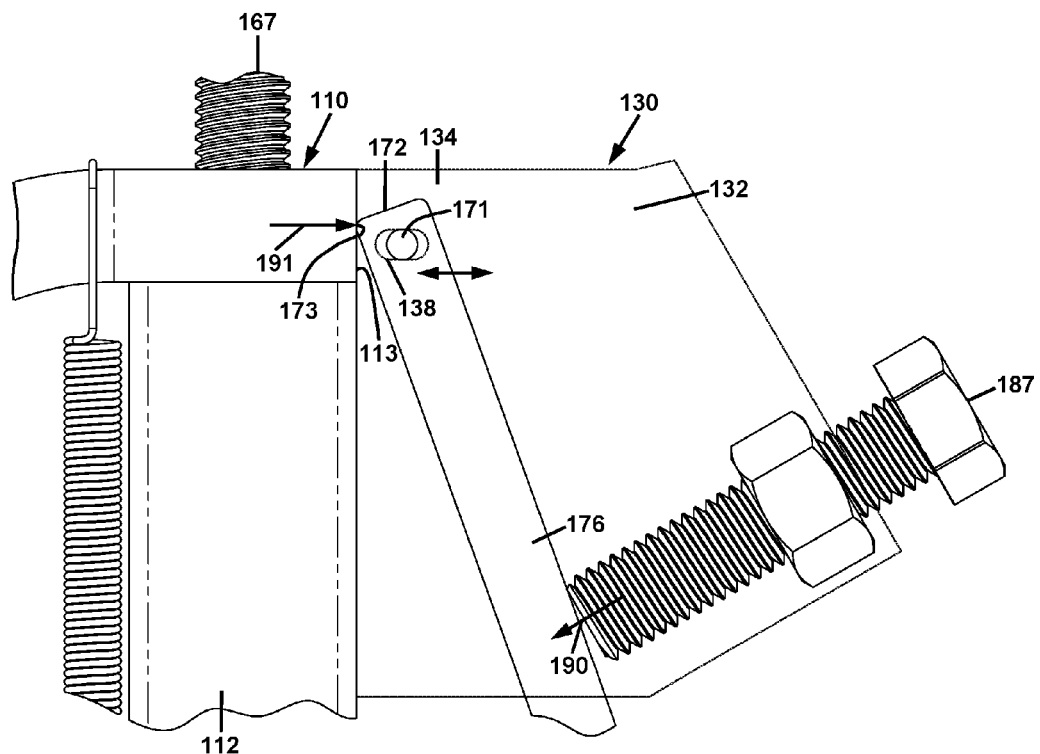
FIG. 7C is a detailed view of the clamp arm as shown in FIG. 7B, depicting the position of the upper end of the clamp arm forced against the housing of the tool.

In certain embodiments, the upper end 172 of the clamp arm 170 of the tool is pivotably joined to the upper region 134 of the lateral bracket 130 in a manner that results in less stress on a pivot pin of the clamp arm 170 during use of the tool 100. Referring to FIGS. 7A-7C, a pivot pin extends laterally through the upper end 172 of the clamp arm 170, and is comprised of a first pin end 171 disposed in a first slot 138 in the bracket wall, and a second pin end (not shown) disposed in a second slot 139 (FIG. 2D) in the bracket wall. The pivot pin may be a simple cylindrical pin that is press fit into the clamp arm 170, or the pivot pin may be a bolt and nut assembly with the shank of the bolt functioning as the pivot section.

When the clamp actuator bolt 187 is screwed into the lateral bracket 130 as indicated by arrow 188, the lower end 174 of the clamp arm pivots as indicated by arcuate arrow 189 to the clamping position. (For the sake of simplicity of illustration in FIG. 7B, a flange of a wheel is not shown being clamped in FIG. 7B.) Referring to FIG. 7C, significant force indicated by arrow 190 is applied to the clamp arm 170 by the bolt 187 when it reaches the clamping position against the wheel flange and stops pivoting. An opposing force occurs by the wheel flange against the lower end 174 of the clamp arm 170. An opposing force also occurs at the upper end 172 of the clamp arm. If the pivot pin were engaged in corresponding circular holes instead of slots 138 and 139, then the opposing force at the upper end 172 of the clamp arm would have to be provided by the pin. Instead, by using slots 138 and 139 to carry the pin, the pin and upper end 172 of the clamp arm 170 are free to move laterally, such that the corner 173 of the clamp arm 170 contacts the side wall 113 of the tool body 110. The side wall 113 provides the opposing force as indicated by arrow 191, and thus excessive stress on the pivot pin that could shear it is avoided. The pivot pin functions only as a pivot member, and not a supporting member to the clamp arm 170.

Figure 8A:
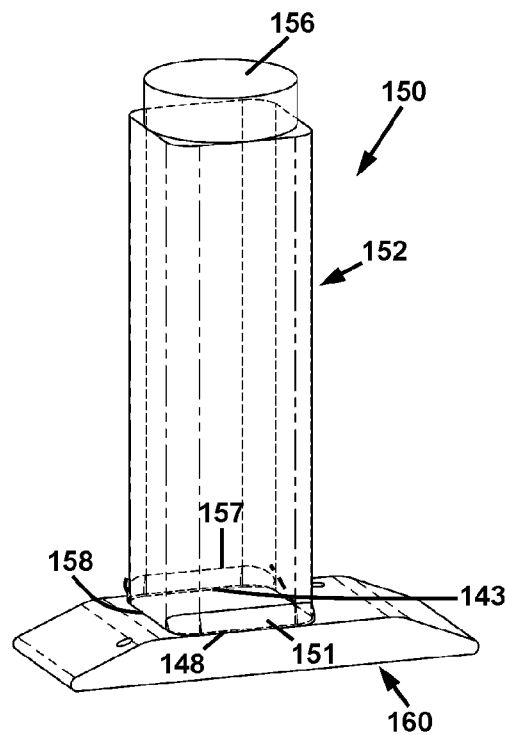
FIGS. 8A and 8B are respective upper perspective and side elevation views of a ram of the tool, showing the base of the ram joined to the lower end of the ram body by longitudinal welds along opposed upper edges of the ram base.
Figure 8B:
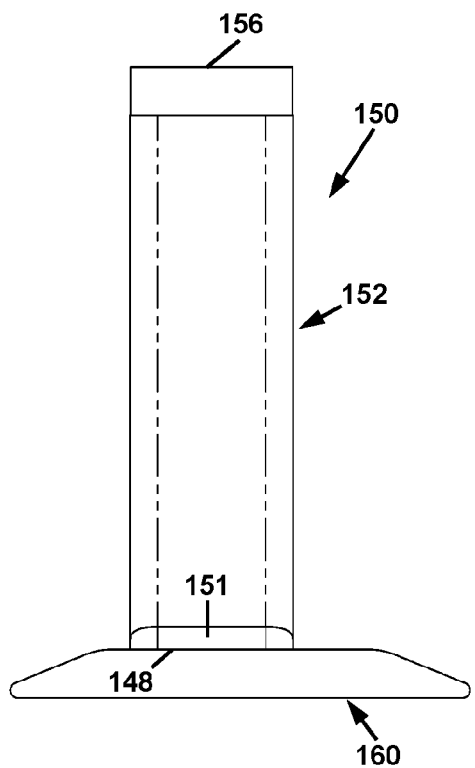

FIGS. 8A and 8B depict a ram 150 of the tool 100 having a particular construction in which the base 160 of the ram 150 is joined to the lower end 158 of the ram body 152 by longitudinal welds along opposed upper edges of the ram base 160. The ram base 160 is joined to the lower end 158 of the ram body 152 by a first longitudinal weld 151 joining a first upper lateral edge 148 of the ram base 160 to a first lower lateral edge 149 of the lower end 158 of the ram body 152 (see also FIGS. 4A and 4B), and a second longitudinal weld 157 joining a second upper lateral edge 143 of the ram base to a second lower lateral edge of the lower end 158 of the ram body 152. The first upper lateral edge 148 of the ram base 160 is opposed to the second upper lateral edge 143 of the ram base 160, and the first lower lateral edge 149 of the lower end 158 of the ram body 152 is opposed to the second lower lateral edge of the lower end 158 of the ram body 152. In the embodiment of FIGS. 8A and 8B, no transverse welds across the ram base 160 are used to join it to the ram body 152. Such a weld configuration is advantageous in providing a strong bond of the ram base 160 to the ram body 152, while enabling the full range of motion of the ram body 152 within the tool housing 110.

The various components of the tire tool 10 are made of structurally strong and rigid materials. Suitable materials include steel, aluminum, and composite materials.

It is therefore apparent that there has been provided, in accordance with the present disclosure, a tool and an associated method for separating the bead portion of a tire from the bead-retaining portion of a wheel. Having thus described the basic concept of the invention, it will be apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be expressly stated in the claims.

We claim:

1. A tool for separating a tire from a wheel, the tool comprising:
 a) a tool body comprised of:
  a housing comprised of a side wall having an upper end and a lower end, and surrounding an inner cavity of a defined cross-sectional shape;
  a lateral bracket joined to a first portion of the side wall of the housing and comprising a bracket wall including an upper region;
  a first holding foot joined to a second portion of the side wall of the housing proximate to the lower end of the housing and comprising a wedge portion extending laterally outwardly from the second portion of the side wall past the first portion of the side wall of the housing and beneath the lateral bracket; and
  a second holding foot joined to a third portion of the side wall of the housing proximate to the lower end of the housing, and comprising a wedge portion extending laterally outwardly from the second portion of the side wall past the first portion of the side wall of the housing and beneath the lateral bracket, wherein the wedge portions of the first and second holding feet are forcible between a bead of the tire and a flange of the wheel to form a gap between the bead and flange;
 b) a ram comprising:
  a ram body having a side wall, an upper end, and a lower end, the ram body disposed in the inner cavity of the housing and having a cross-sectional shape corresponding to the cross-sectional shape of the housing, so as to be slidable within the cavity of the housing; and
  a ram base contactable with a side wall of the tire, the ram base joined to the lower end of the ram body and comprising a first ram foot extending laterally outwardly a first distance past a first portion of the side wall of the ram body, and a second ram foot extending laterally outwardly a second distance past a second portion of the side wall of the ram body opposed to the first portion of the side wall of the ram body;
  wherein the ram body is removable from the inner cavity of the housing, rotatable, and replaceable in the inner cavity of the housing in a first position in which the first ram foot extends laterally outwardly the first distance between the first and second holding feet of the tool body, and replaceable in the inner cavity of the housing in a second position in which the second ram foot extends laterally outwardly the second distance between the first and second holding feet of the tool body;
 c) a ram actuator connected to the upper end of the housing and comprising a ram rod engaged with the upper end of the ram body, and operable so as to displace the ram body downwardly within the inner cavity of the housing and to displace the ram base downwardly away from the lower end of the housing;
 d) a clamp arm comprising an upper end pivotably joined to the upper region of the lateral bracket, and a lower end pivotable from an open position distal from the first and second holding feet of the tool body to a clamping position proximal to the first and second holding feet of the tool body; and
 e) a clamp actuator connected to a lower portion of the lateral bracket and comprising a clamp rod engaged with a central region of the clamp arm, and operable so as to pivot the lower end of the clamp arm from the open position distal to the clamping position.

2. The tool of claim 1, further comprising a spacer plate disposed on the side wall of the housing beneath the lateral bracket, the spacer plate contactable with the flange of the wheel so as to limit the distance that the wedge portions of the first and second holding feet extend between the bead of the tire and the flange of the wheel when the tool is in use on the tire and wheel.

3. The tool of claim 1, wherein the upper end of the clamp arm is pivotably joined to the upper region of the lateral bracket by a pin extending laterally through the upper end of the clamp arm, and comprising a first pin end disposed in a first slot in the bracket wall, and a second pin end disposed in a second slot in the bracket wall.

4. The tool of claim 1, wherein the ram rod of the ram actuator is a bolt threadably engaged with the upper end of the housing, and wherein rotation of the bolt in a first direction causes a distal end of the bolt to contact the upper end of the ram body and displace the ram base downwardly away from the lower end of the housing.

5. The tool of claim 1, wherein the clamp rod of the clamp actuator is a bolt threadably engaged with the bracket wall of the lateral bracket, and wherein rotation of the bolt in a first direction causes a distal end of the bolt to contact the central region of the clamp arm and pivot the lower end of clamp arm toward the first and second holding feet of the tool body.

6. The tool of claim 1, wherein the ram base is joined to the lower end of the ram body by a pair of welds consisting of a first longitudinal weld joining a first upper lateral edge of the ram base to a first lower lateral edge of the lower end of the ram body, and a second longitudinal weld joining a second upper lateral edge of the ram base to a second lower lateral edge of the lower end of the ram body, the first upper lateral edge of the ram base opposed to the second upper lateral edge of the ram base, and the first lower lateral edge of the lower end of the ram body opposed to the second lower lateral edge of the lower end of the ram body.

7. A tool for separating a tire from a wheel, the tool comprising:
 a) a tool body comprised of:
  a housing comprised of a side wall having an upper end and a lower end, and surrounding an inner cavity of a defined cross-sectional shape; and
  a lateral bracket joined to a first portion of the side wall of the housing and comprising a bracket wall including an upper region;
  a first holding foot joined to a second portion of the side wall of the housing proximate to the lower end of the housing and comprising a wedge portion extending laterally outwardly from the second portion of the side wall past the first portion of the side wall of the housing and beneath the lateral bracket;
  a second holding foot joined to a third portion of the side wall of the housing proximate to the lower end of the housing, and comprising a wedge portion extending laterally outwardly from the second portion of the side wall past the first portion of the side wall of the housing and beneath the lateral bracket, wherein the wedge portions of the first and second holding feet are forcible between a bead of the tire and a flange of the wheel to form a gap between the bead and flange;

b) a ram comprising:

a ram body having a side wall, an upper end, and a lower end, the ram body disposed in the inner cavity of the housing and having a cross-sectional shape corresponding to the cross-sectional shape of the housing, so as to be slidable within the cavity of the housing;

a ram base contactable with a side wall of the tire, the ram base joined to the lower end of the ram body by a pair of welds consisting of a first longitudinal weld joining a first upper lateral edge of the ram base to a first lower lateral edge of the lower end of the ram body, and a second longitudinal weld joining a second upper lateral edge of the ram base to a second lower lateral edge of the lower end of the ram body, the first upper lateral edge of the ram base opposed to the second upper lateral edge of the ram base, and the first lower lateral edge of the lower end of the ram body opposed to the second lower lateral edge of the lower end of the ram body;

c) a ram actuator joined to the upper end of the housing and comprising a ram rod engaged with the upper end of the ram body, and operable so as to displace the ram body downwardly within the inner cavity of the housing and to displace the ram base downwardly away from the lower end of the housing;

d) a clamp arm comprising an upper end pivotably joined to the upper region of the lateral bracket, and a lower end pivotable from an open position distal from the first and second holding feet of the tool body to a clamping position proximal to the first and second holding feet of the tool body; and e) a clamp actuator joined to a lower portion of the lateral bracket and comprising a clamp rod engaged with a central region of the clamp arm, and operable so as to pivot the lower end of the clamp arm from the open position distal to the clamping position.

8. The tool of claim 7, wherein the ram base is comprised of a first ram foot extending laterally outwardly a first distance past a first portion of the side wall of the ram body, and a second ram foot extending laterally outwardly a second distance past a second portion of the side wall of the ram body opposed to the first portion of the side wall of the ram body.

9. The tool of claim 7, further comprising a spacer plate disposed on the side wall of the housing beneath the lateral bracket, the spacer plate contactable with the flange of the wheel so as to limit the distance that the wedge portions of the first and second holding feet extend between the bead of the tire and the flange of the wheel when the tool is in use on the tire and wheel.

10. The tool of claim 7, wherein the upper end of the clamp arm is pivotably joined to the upper region of the lateral bracket by a pin extending laterally through the upper end of the clamp arm, and comprising a first pin end disposed in a first slot in the bracket wall, and a second pin end disposed in a second slot in the bracket wall.

11. The tool of claim 7, wherein the ram rod of the ram actuator is a bolt threadably engaged with the upper end of the housing, and wherein rotation of the bolt in a first direction causes a distal end of the bolt to contact the upper end of the ram body and displace the ram base downwardly away from the lower end of the housing.

12. The tool of claim 7, wherein the clamp rod of the clamp actuator is a bolt threadably engaged with the bracket wall of the lateral bracket, and wherein rotation of the bolt in a first direction causes a distal end of the bolt to contact the central region of the clamp arm and pivot the lower end of clamp arm toward the first and second holding feet of the tool body.

13. A tool for separating a tire from a wheel, the tool comprising:

a) a tool body comprised of:

a housing comprised of a side wall having an upper end and a lower end, and surrounding an inner cavity of a defined cross-sectional shape;

a lateral bracket joined to a first portion of the side wall of the housing and comprising a bracket wall including an upper region;

a first holding foot joined to a second portion of the side wall of the housing proximate to the lower end of the housing and comprising a wedge portion extending laterally outwardly from the second portion of the side wall past the first portion of the side wall of the housing and beneath the lateral bracket; and a second holding foot joined to a third portion of the side wall of the housing proximate to the lower end of the housing, and comprising a wedge portion extending laterally outwardly from the second portion of the side wall past the first portion of the side wall of the housing and beneath the lateral bracket, wherein the wedge portions of the first and second holding feet are forcible between a bead of the tire and a flange of the wheel to form a gap between the bead and flange;

b) a ram comprising:

a ram body having a side wall, an upper end, and a lower end, the ram body disposed in the inner cavity of the housing and having a cross-sectional shape corresponding to the cross-sectional shape of the housing, so as to be slidable within the cavity of the housing; and a ram base contactable with a side wall of the tire, the ram base joined to the lower end of the ram body and comprising a first ram foot extending laterally outwardly a first distance past a first portion of the side wall of the ram body between the first and second holding feet of the tool body;

c) a ram actuator connected to the upper end of the housing and comprising a ram rod engaged with the upper end of the ram body, and operable so as to displace the ram body downwardly within the inner cavity of the housing and to displace the ram base downwardly away from the lower end of the housing;

d) a clamp arm comprising:

an upper end pivotably joined to the upper region of the lateral bracket by a pin extending laterally through the upper end of the clamp arm and comprising a first pin end disposed in a first slot in the bracket wall and a second pin end disposed in a second slot in the bracket wall; and a lower end pivotable from an open position distal from the first and second holding feet of the tool body to a clamping position proximal to the first and second holding feet of the tool body; and e) a clamp actuator connected to a lower portion of the lateral bracket and comprising a clamp rod engaged with a central region of the clamp arm, and operable so as to pivot the lower end of the clamp arm from the open position distal to the clamping position.

14. The tool of claim 13, wherein when the clamp arm actuator operates to pivot the lower end of the clamp arm from the open position to the clamping position, the first and second pin ends of the clamp arm move laterally in the respective first and second slots in the bracket wall, causing the upper end of the clamp arm to contact the first portion of the side wall of the housing.

15. The tool of claim 13, wherein the ram base is comprised of a first ram foot extending laterally outwardly a first distance past a first portion of the side wall of the ram body, and a second ram foot extending laterally outwardly a second distance past a second portion of the side wall of the ram body opposed to the first portion of the side wall of the ram body.

16. The tool of claim 13, further comprising a spacer plate disposed on the side wall of the housing beneath the lateral bracket, the spacer plate contactable with the flange of the wheel so as to limit the distance that the wedge portions of the first and second holding feet extend between the bead of the tire and the flange of the wheel when the tool is in use on the tire and wheel.

17. The tool of claim 13, wherein the ram rod of the ram actuator is a bolt threadably engaged with the upper end of the housing, and wherein rotation of the bolt in a first direction causes a distal end of the bolt to contact the upper end of the ram body and displace the ram base downwardly away from the lower end of the housing.

18. The tool of claim 13, wherein the clamp rod of the clamp actuator is a bolt threadably engaged with the bracket wall of the lateral bracket, and wherein rotation of the bolt in a first direction causes a distal end of the bolt to contact the central region of the clamp arm and pivot the lower end of clamp arm toward the first and second holding feet of the tool body.

19. The tool of claim 13, wherein the ram base is joined to the lower end of the ram body by a pair of welds consisting of a first longitudinal weld joining a first upper lateral edge of the ram base to a first lower lateral edge of the lower end of the ram body, and a second longitudinal weld joining a second upper lateral edge of the ram base to a second lower lateral edge of the lower end of the ram body, the first upper lateral edge of the ram base opposed to the second upper lateral edge of the ram base, and the first lower lateral edge of the lower end of the ram body opposed to the second lower lateral edge of the lower end of the ram body.

* * * * *